UNITED STATES PATENT OFFICE.

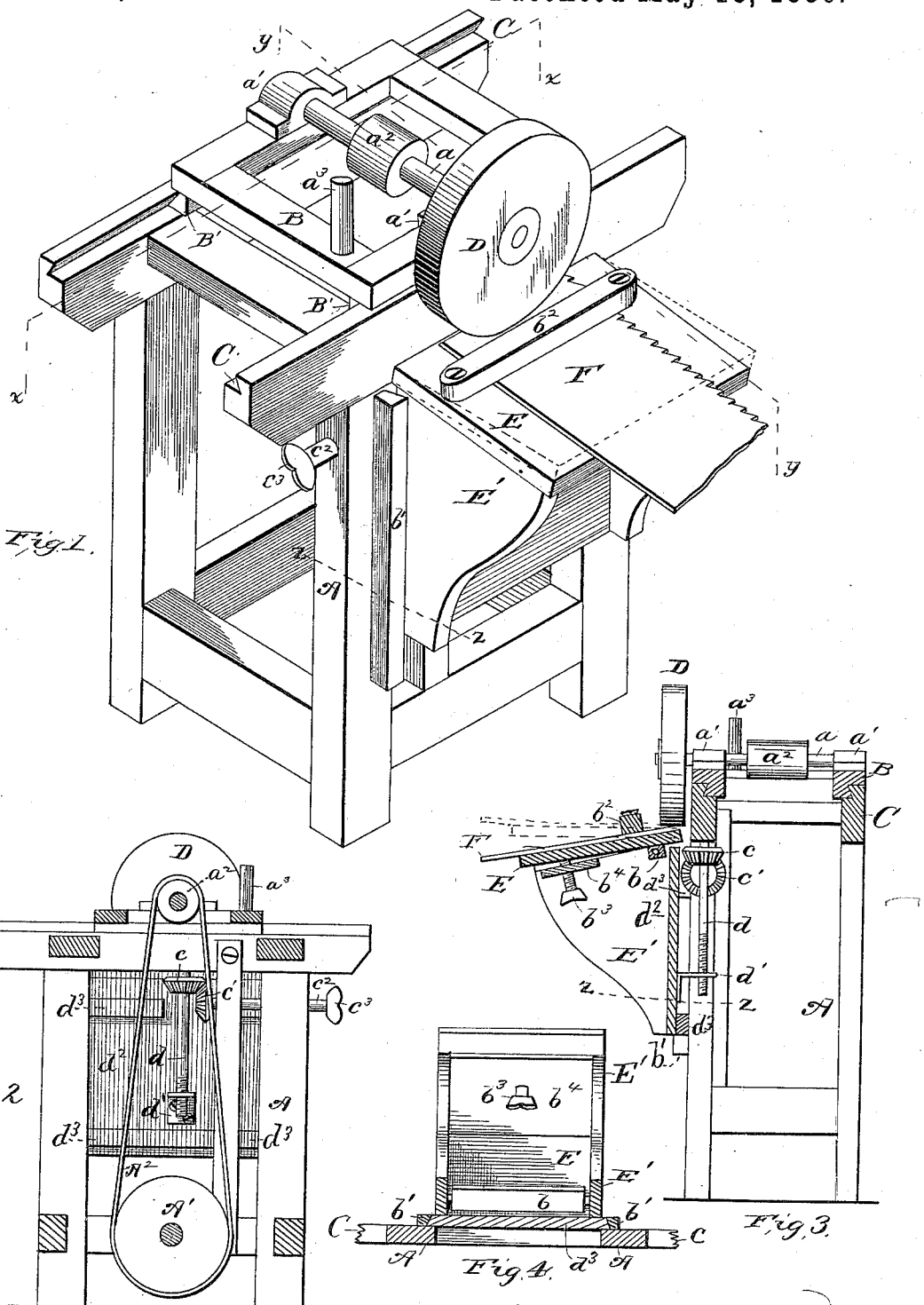

JENS MORITZ PETERSEN, OF CLINTON, IOWA.

MACHINE FOR FITTING BAND-SAWS FOR BRAZING.

SPECIFICATION forming part of Letters Patent No. 341,939, dated May 18, 1886.

Application filed December 2, 1885. Serial No. 184,501. (No model.)

*To all whom it may concern:*

Be it known that I, JENS MORITZ PETERSEN, a citizen of the United States of America, residing at Clinton, in the county of Clinton and State of Iowa, have invented certain new and useful Improvements in Machines for Fitting Band-Saws for Brazing, of which the following is a specification, reference being had therein to the accompanying drawings.

My invention relates to improvements in devices for fitting the ends of band-saws preparatory to brazing them together. It is well known that the joints of the ends of band-saws are very liable to break, and that great care and much time are required to fit the ends perfectly together in the ordinary method of fitting them with a file.

The object of my invention is the construction of a machine with which the ends of these saws may be fitted more accurately and in much less time than by the ordinary method; and my invention consists in the construction and combinations of the devices for this purpose, as hereinafter fully set forth and claimed.

In the drawings, Figure 1 is a perspective of my improved machine. Fig. 2 is a vertical section on line $x\ x$ of Fig. 1. Fig. 3 is a vertical section on line $y\ y$ of Fig. 1. Fig. 4 is a cross-section on line $z\ z$ of Figs. 1 and 3.

A designates the frame of my machine.

B is a traveling carriage, having dovetail runners B', constructed to slide in the dovetail ways C, formed on the top plates of the frame of the machine, as shown.

D is an emery-wheel or grindstone mounted on the shaft $a$, journaled in bearings $a'\ a'$ on the top of the carriage-frame. This shaft is provided with a pulley, $a^2$.

The carriage-frame is provided with a post, $a^3$, which serves as a handle for the operator in moving the carriage back and forth in the operation of fitting the ends of the saw.

The reducing-wheel is revolved by a belt, $A^2$, running over the pulley $a^2$ and a drive-pulley, $A'$, which may be run by any suitable power and means. (Not shown.)

E is an adjustable table, the inner end of which is fastened to a bar, $b$, the ends of which are pivoted to the inner upper portions of the supporting-brackets E'. The inner edges of these brackets are fastened to a back board, $d^2$, to the upper and lower portions of which are fastened the cleats $d^3$, which have their ends constructed to fit and slide vertically in the dovetail guides $b'$.

The table is provided with a clamp-bar, $b^2$, attached to the table by set-screws for clamping and firmly holding in place the ends of the saw F while the ends are being beveled and fitted for brazing. The table-top E, being fastened, as set forth, to the pivoted bar $b$, is adjustable at any required inclination to secure the required bevel of the ends of the saw by the set-screw $b^3$, extended through a threaded bearing in the plate $b^4$, which plate is fastened at the ends to and serves as a stay for the supporting-brackets E'. The upper end of this set-screw impinges against the under side of the table, as shown in Fig. 3 of the drawings.

The table is adjustable in height by means of the bevel gear-wheel $c$, mounted on the upper portion of the vertical shaft $d$, and the gear-wheel $c'$ on the inner end of the horizontal shaft $c^2$, which has its bearing in the frame, and its outer end is provided with the thumb-piece $c^3$. The vertical shaft $d$ is supported at its upper end by a swivel-connection with the frame of the machine, and the lower end of this shaft is threaded and extended through a threaded hole through the bracket-plate $d'$, fastened to the back board, $d^2$, of the table-brackets; and it is readily seen that the table may be raised and lowered, as required, by turning in the required direction the thumb-piece $c^3$ on the shaft $c^2$.

The ends of the saw to be fitted and brazed together are placed one at a time on the table under the clamp-bar $b^2$, and extended under the wheel D, the square ends of the saw being set parallel with the line of the carriage-frame. The clamp-bar is then screwed down tightly, clamping and firmly holding the saw in position, as shown in Figs. 1 and 3 of the drawings. One end of the saw being thus adjusted under the clamp-bar and the table being adjusted in the required height and inclination, the reducing-wheel is caused to revolve by power properly applied to the shaft of the drive-pulley, and as the metal is cut away from the saw the table is elevated, keeping the saw in constant contact with the wheel, and by means of the handle $a^3$ the operator is enabled to move the carriage back and forth in its ways, causing the wheel to cut the required bevel across the entire width of the end of the saw. The end of the saw thus fitted is then removed, and the other end is adjusted under the clamp, the reverse side of the same being upward, and fitted in the same manner as above described. Thus the ends of the saw may be beveled and trued at the exact angle required for fitting them perfectly together, making a better and more durable joint, and in much less time than these ends can be fitted and jointed together by the ordinary method.

What I claim as new, and desire to secure by Letters Patent, is—

In a machine for fitting the ends to be jointed together of a band-saw, the combination of the traveling carriage B, the reducing-wheel D, journaled upon the carriage, the table E, provided with a clamping-bar, $b^2$, and secured to a bar, $b$, journaled in vertically-adjustable brackets E', which are provided with a back board, $d^2$, a fixed plate, $b^4$, and adjusting-screw $b^3$, the threaded vertical shaft $d$, provided with gear-wheel $c$, bracket-plate $d'$, fastened to back board, $d^2$, and the horizontal shaft $c^2$, with gear-wheel $c'$, substantially as and for the purposes described.

In testimony whereof I hereto affix my signature in presence of two witnesses.

JENS MORITZ PETERSEN.

Witnesses:
W. W. SANBORN,
J. H. WALLIKER.